F. A. NELSON.
CAR FENDER.
APPLICATION FILED NOV. 25, 1907.

910,948.

Patented Jan. 26, 1909.

3 SHEETS—SHEET 1.

WITNESSES

INVENTOR
FRANK A. NELSON
BY Paul & Paul
HIS ATTORNEYS

F. A. NELSON.
CAR FENDER.
APPLICATION FILED NOV. 25, 1907.

910,948.

Patented Jan. 26, 1909.
3 SHEETS—SHEET 2.

WITNESSES
OMWalstrom
J. H. Baldwin

INVENTOR
FRANK A. NELSON
BY Paul & Paul
HIS ATTORNEYS

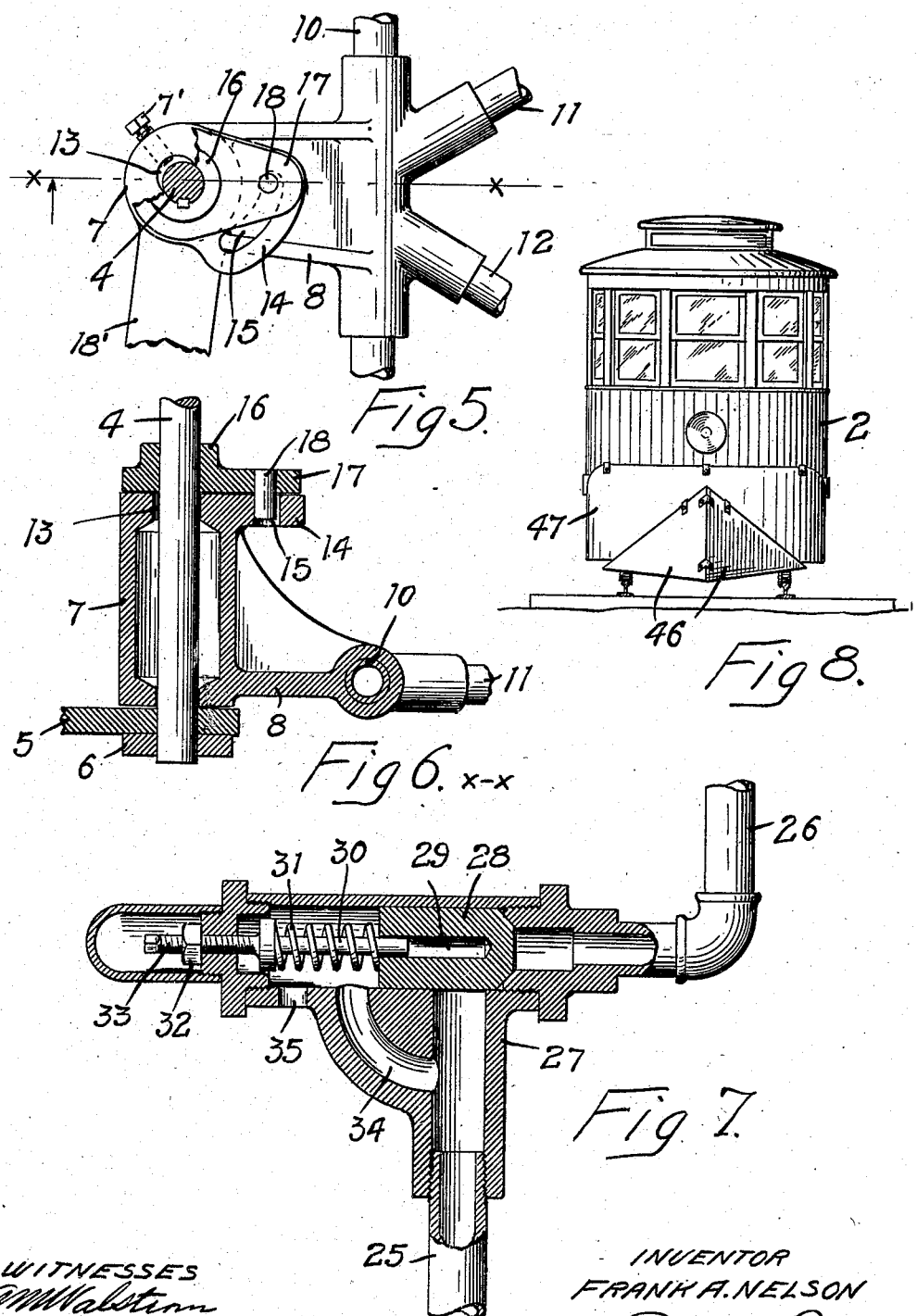

UNITED STATES PATENT OFFICE.

FRANK A. NELSON, OF MINNEAPOLIS, MINNESOTA, ASSIGNOR, BY DIRECT AND MESNE ASSIGNMENTS, TO AMERICAN AUTOMATIC FENDER COMPANY, OF MINNEAPOLIS, MINNESOTA, A CORPORATION OF MINNESOTA.

CAR-FENDER.

No. 910,948.    Specification of Letters Patent.    Patented Jan. 26, 1909.

Application filed November 25, 1907. Serial No. 403,604.

*To all whom it may concern:*

Be it known that I, FRANK A. NELSON, of Minneapolis, Hennepin county, Minnesota, have invented certain new and useful Improvements in Car-Fenders, of which the following is a specification.

My invention relates to fenders or life guards capable of application to any style or type of car but designed particularly for use on street or tram cars.

The object of my invention is to provide a fender which, when not in use, will present the appearance of the pilot of a locomotive.

A further object is to provide a fender that is capable of being easily and quickly unfolded or expanded for the purpose of picking up a person or object on the track.

A further object is to provide a fender of compact and durable construction and one that is positive and reliable in its action and entirely within the control of the driver of the car.

The invention consists generally in a folding fender and means for operating the same.

Further, the invention consists in a folding fender and a fluid-pressure-operated mechanism for expanding or unfolding and folding the same.

Further, the invention consists in various constructions and combinations, all as hereinafter described and particularly pointed out in the claims.

Figure 1:
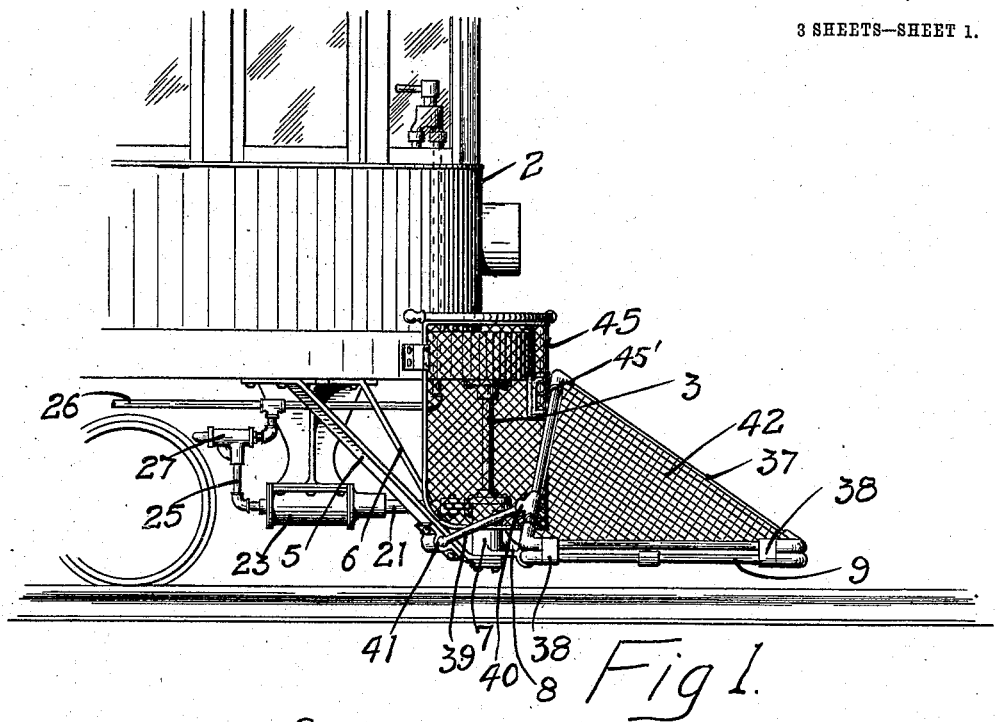
Figure 2:
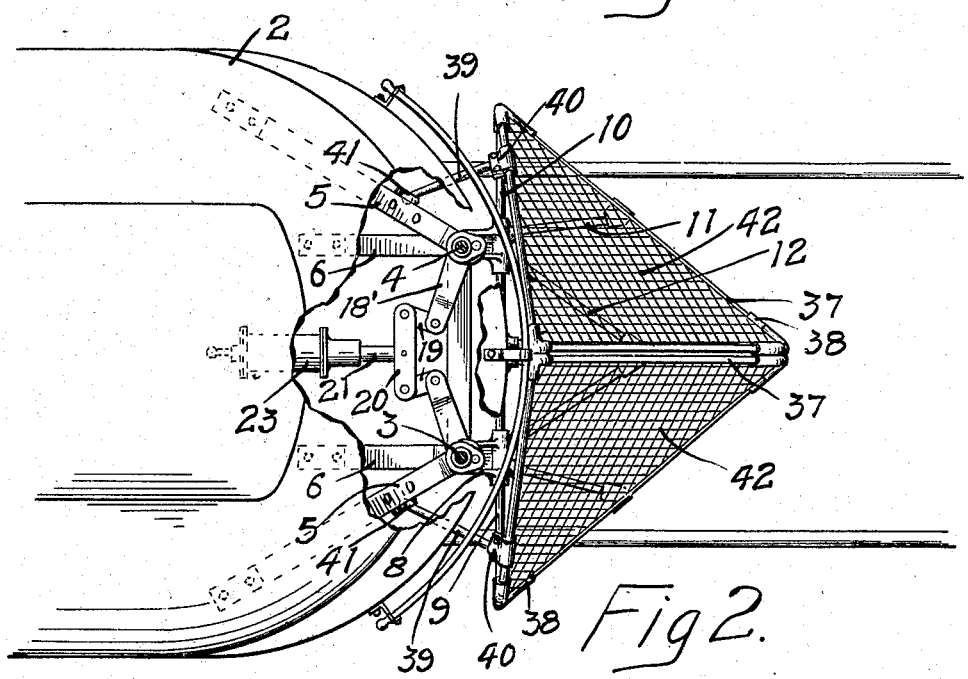
Figure 3:
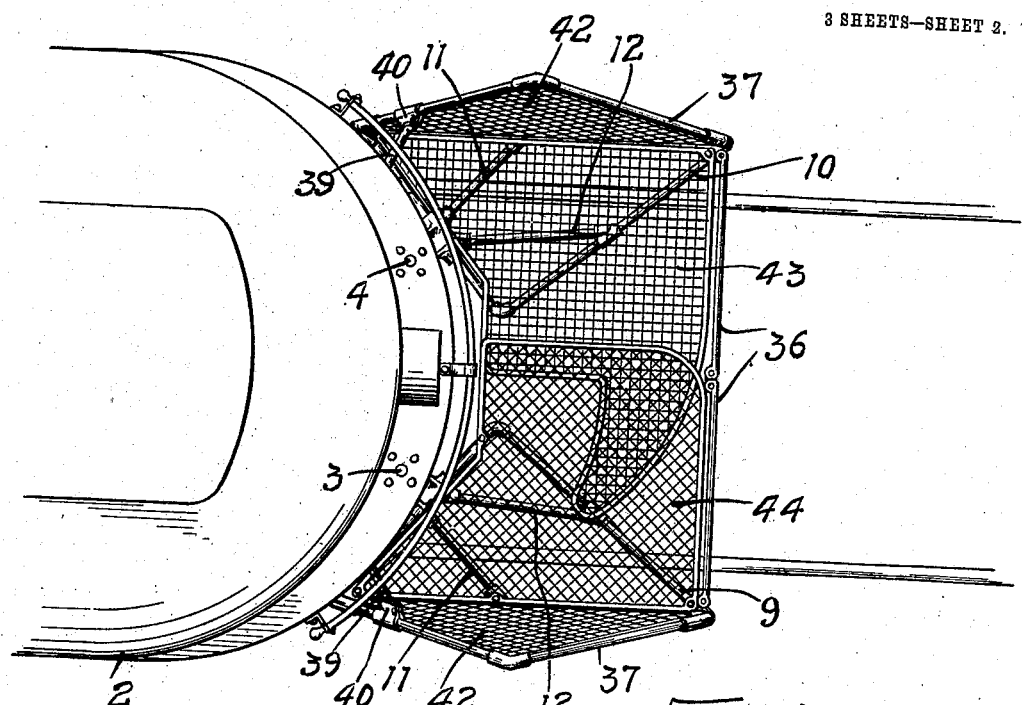
Figure 4:
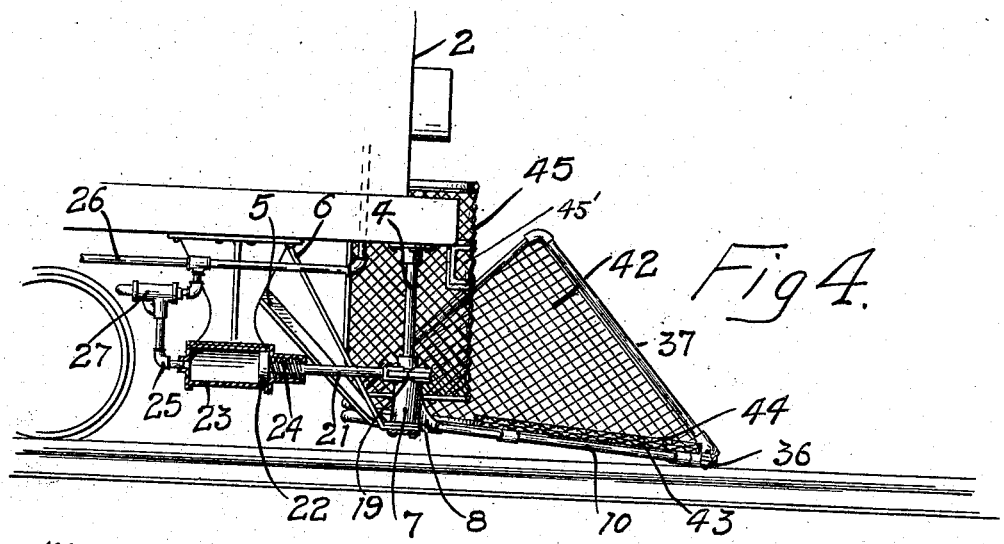

In the accompanying drawings, forming part of this specification, Figure 1 is a side elevation of the forward portion of a street car with my invention applied thereto. Fig. 2 is a top view of the same. Fig. 3 is a top view showing the fender in its unfolded or expanded position. Fig. 4 is a side elevation illustrating the mechanism for operating the fender. Fig. 5 is a detail view illustrating the means for supporting the fender. Fig. 6 is a sectional view on the line $x$—$x$ of Fig. 5. Fig. 7 is a detail sectional view of the valve mechanism for controlling the admission of the fluid pressure to the fender operating mechanism. Fig. 8 is a detail view illustrating the fender adapted for use as a snow plow.

In the drawing, 2 represents the forward portion of a street car to which I have shown my improved fender applied. I have used the street car merely for the purpose of illustration, as the invention is capable of application to locomotives of all types, operated either by steam or electricity, and to any type of car on which a device of this kind would be necessary or useful.

Under the forward portion of the car I suspend two shafts 3 and 4. The lower ends of these shafts are near the ground and are held in their normal vertical position by means of braces 5 and 6 which connect the said lower ends with the car body. Above these braces on each shaft, hubs 7 are mounted and provided with arms 8 wherein the rear portions of triangular frames 9 and 10 are mounted and have a horizontal swinging movement with said hubs. When these frames are in their normal position their inner edges will be in contact with one another and their outer edges will converge toward the center in the form of an ordinary pilot. The frames are carried by the arms 8 and when the arms are moved horizontally the frames will swing also and assume a position over the rails, as indicated in Fig. 3, or be drawn together with their edges in contact to form the ordinary pilot.

Braces 11 and 12 connect the arms 8 with the sides of the frames 9 and 10 and serve to brace and stiffen the same. The hubs 7 have openings 13 therethrough to receive the shaft for the purpose of allowing the frames to drop down and be near to or rest upon the rails. This lowering of the forward end of the fender takes place when the device is unfolded for the purpose of taking up a person or object on the track. Normally the fender frames will be raised out of contact with the rails and this is effected by means of flanges 14 provided on the upper ends of said hubs and having cam slots 15 therein. Collars 16 are keyed on said shafts and have lugs 17 provided with pins 18 that are adapted to enter the slots 15. One end of each slot 15 is nearer the shaft than its opposite end and consequently when the hubs are rotated on their shafts and the flanges 14 moved on the pins 18 until the pins are in the opposite ends of the slots from the position shown in Fig. 5, the hubs will be allowed to tilt forwardly by reason of the loose bearings in the shafts and permit the fender to drop down upon the track. The degree of this forward movement of the hubs is regulated by the set screws 7' that are mounted in the hubs and adapted to engage the shafts 4 and limit the tilting forward movement of the hubs and the frames supported thereby.

Each hub is provided with an arm 18' projecting inwardly and connected at their inner ends by links 19 with a bar 20 that is centrally pivoted on a piston rod 21. The piston 22 of said rod is arranged within a cylinder 23 and is normally held at the rear end of said cylinder by a spring 24 coiled on said rod. A pipe 25 connects the rear end of the cylinder with the line pipe 26 which controls the brakes, and a casing 27 is provided in the pipe 25. This casing has a reciprocating valve 28 provided with a socket 29, and a stem 30 has one end within said socket and is provided with a spring 31 which normally holds the said valve in its closed position, the tension of said spring being regulated by an adjusting nut 32 on the threaded end 33 of the stem. The spring 31 has sufficient strength to normally hold the valve against its seat when the usual pressure of air is employed to operate the brakes. In case, however, of an emergency, a higher pressure is admitted to the line pipe which will overcome the tension of the spring 31 upon the valve 28 and allow the air to flow down into the cylinder 23 in the rear of its piston, whereupon the piston will be immediately driven forward and the fender operating mechanism actuated to swing the fender frames outwardly away from one another to the position shown in Fig. 3.

A by-pass 34 is provided, connecting the pipe 25 with the rear of the valve 28 and an exhaust port 35 is provided in the rear of said valve through which the fluid pressure may escape and allow the valve and piston to return to their normal position.

For the purpose of locking the horizontal swinging frames in their open position I prefer to provide toggle arms 36 pivotally connected to one another at their inner ends and pivoted to the forward ends of the frames. When the frames are folded, these toggle arms will be parallel with one another and when the frames are unfolded the toggle arms will swing to a position in line with one another and will lock the frames open. These toggle arms will be tripped by the driver when it is desired to fold the frames. In addition to these horizontal swinging frames I prefer to provide triangular wings 37 hinged at 38 on the triangular frames and adapted to swing outwardly and upwardly to prevent a person or object picked up by the fender, from rolling off the sides thereof under the wheels of the car. These wings normally occupy the position shown in Fig. 1 and form the upper portion of the pilot-like fender when it is not in use. To open them simultaneously with the outward swinging of the fender frames I provide rods 39 having ball and socket bearings 40 and 41 in the said wings, and in the braces 5.

When the hubs are swung on their bearings, the rods 39 swinging on a different center will cause the wings to be raised to an open position as shown in Fig. 3 and form substantially vertical side walls for the fender and positively prevent any object or person picked up by the fender from being thrown out to the side of the car. The wings will operate simultaneously with the swinging frames and will assume a vertical position during the unfolding operation by the time the frames are unfolded to their expanded form above the rails. The wings are provided with a suitable netting 42, preferably of wire, and sheets of netting 43 and 44 are provided for the swinging frames, one sheet being adapted to slide upon the other during the operation of folding or unfolding the said frames. In the rear of the fender I provide a net 45 which acts as a guard to prevent the person picked up by the fender from being injured by contact with the front of the car. This net or life guard 45 has a small door 45' therein through which access may be had to the draw bar when it is desired to couple two cars together.

In Fig. 8 I have illustrated sheet metal plates 46 adapted to be fitted over the swinging wings, completely covering the wire mesh thereon and forming a snow plow which may be utilized in running the car through light snow. The guard net in the rear of the pilot is also equipped with a sheet metal plate 47. These plates 46 and 47 are readily removable and being comparatively light can be easily and quickly fitted when it is desired to use the pilot as a snow plow.

I have shown this invention operated by air pressure but any other fluid pressure may be used if preferred, and various other means might be employed for opening and closing the hinged frames. I do not, therefore, wish to be confined to the particular operating means disclosed herein.

I claim as my invention:—

1. A fender comprising horizontal frames having a movement toward and from one another in substantially the same horizontal plane, and means for operating said frames.

2. A fender comprising horizontal frames arranged to swing toward and from one another to fold or unfold the fender, and a fluid-pressure-controlled mechanism for operating said frames.

3. A folding fender comprising pivoted horizontal frames adapted to swing toward and from one another, means for locking said frames in their expanded position, and a fluid-pressure-controlled mechanism for operating said frames.

4. A fender comprising hinged horizontal frames arranged to swing toward and from one another in a substantially horizontal plane, means for closing the space between said frames when separated, and means arranged to be moved to a substantially vertical position to form guards at the sides of said frames when the fender is unfolded, substantially as described.

5. A fender comprising triangular horizontal frames and oscillating hubs whereon said frames are supported, the inner edges of said frames being normally contiguous to one another and in substantially the same horizontal plane and said frames assuming when in their normal position the shape of an ordinary pilot, and means for operating said hubs to separate said frames and expand said fender.

6. The combination, with a car having a fluid pressure brake operating means, of a fender suspended on said car and comprising oscillating frames adapted to be moved toward or from each other to fold or unfold the fender, and mechanism normally inoperative under the normal fluid pressure for operating the brakes but becoming operative to unfold said fender when an emergency pressure is applied to the brakes.

7. The combination, with a car having a fluid pressure brake controlling means, of a folding fender mounted on said car, and mechanism for unfolding said fender, said mechanism being normally inoperative under the normal fluid pressure but becoming instantly operative to unfold said fender under an increased or emergency fluid pressure.

8. A folding fender comprising horizontal frames arranged to swing toward and from one another in substantially the same horizontal plane, and means for operating said frames, and wings normally supported above said frames in an inclined position, and means for swinging said wings to an upright position to form guards at the sides of the fender when said frames are actuated to separate them from one another and unfold the fender.

9. The combination, with a car, of a folding fender supported thereon and comprising horizontally oscillating frames and means for operating the same in substantially the same horizontal plane, and wings hinged on said frames and normally lying in an inclined position thereon, and means actuated by the outward movement of said frames for swinging said wings to an upright operative position, substantially as described.

10. The combination, with a car, of frames triangular in form mounted thereon and adapted to swing horizontally toward and from one another in substantially the same horizontal plane, a suitable fabric covering said frames, triangular wings hinged on said frames and normally lying in an inclined position therein, means for operating said frames and means for simultaneously raising said wings to an upright position or returning them to their normal position, substantially as described.

11. A sectional pilot fender comprising horizontal base frames or sections arranged to move in substantially the same horizontal plane, and hinged guard wings mounted on said sections, and means for moving said sections and said wings outwardly to separate the opposite portions of the fender and unfold the same.

12. A sectional pilot fender comprising triangular base frames or sections, said sections being horizontally arranged and adapted to swing horizontally toward and from one another, and triangular guard wings mounted on said frames and having their inner edges contiguous to one another when folded and inclined downwardly from said contiguous edges toward each side and forming the convex upper portion of the pilot fender, and means for operating said sections and wings to fold or unfold them.

13. A pilot fender comprising base frames or sections and triangular guard wings mounted on said frames and having their inner edges contiguous to one another when folded, said wings being inclined downwardly from said contiguous edges toward each side and forming the convex upper portion of the pilot fender, and means for operating said wings to fold or unfold them.

14. A pilot fender comprising horizontally moving base frames or sections, and guard wings mounted on said frames and having their inner edges contiguous to one another when folded, said wings being inclined downwardly from said contiguous edges toward each side to form the upper convex portion of the pilot fender, and means for operating said frames and wings to fold or unfold them.

15. The combination, with a car having a fluid pressure brake operating means, of a fender suspended at its rear end from said car and comprising horizontal sections arranged to swing horizontally toward and from one another, hubs whereon said sections are supported, said hubs having means whereby said sections are permitted to tilt downwardly at a predetermined point in their horizontal movement, and a fluid pressure controlled mechanism for operating said hubs.

16. The combination, with a car having a fluid pressure brake operating means, of a fender composed of sections arranged to move horizontally toward or from each other, hubs connected to said sections and having means whereby the forward portions of said sections will be allowed to tilt downwardly at a predetermined point in their movement, and a fluid pressure controlled mechanism for operating said hubs.

17. The combination, with a car having a fluid pressure brake operating means, of a fender composed of sections arranged to oscillate horizontally toward or from each other, hubs connected to said sections and having means whereby the forward portions of said sections will be allowed to tilt downwardly at a predetermined point in their oscillating movement, side wings or guards provided in connection with said fender sections, and means for oscillating said hubs to operate said sections.

18. The combination, with a car, of shafts depending therefrom, hubs mounted on said shafts and adapted to rotate thereon, a fender composed of horizontal sections operatively connected with said hubs and adapted to swing horizontally toward and from one another, said sections when folded assuming a triangular pilot-shaped form, triangular wings provided on said sections and adapted to swing inwardly thereover to coincide therewith and form the convex upper portion of the pilot fender, said wings having operative connections with said hubs, and means for oscillating said hubs to open said wings and separate said fender sections.

19. A fender comprising frames having a swinging movement toward and from one another, in substantially the same horizontal plane, toggle links connecting said frames and adapted when straightened and in line with one another to lock said frames in their expanded or open position, and fenders interposed between said frames.

20. The combination, with a car having a fluid pressure brake controlling means, of a fender, and folding wings mounted thereon and having their inner edges contiguous to one another when folded and inclined downwardly from said contiguous edges toward each side and forming the convex upper portion of a pilot fender and mechanism for moving said wings to an operative or inoperative position, said mechanism being normally inoperative under the normal fluid pressure, but becoming instantly operative to move said wings under an increased or emergency fluid pressure.

In witness whereof, I have hereunto set my hand this 15th day of November 1907.

FRANK A. NELSON.

Witnesses:
RICHARD PAUL,
J. H. BALDWIN.